April 23, 1968  L. G. WARREN, JR  3,379,192
DENTAL TREATMENT DEVICE
Filed May 10, 1965  2 Sheets-Sheet 1

INVENTOR.
LAMAR G. WARREN, JR.
BY Ernest Carl Edge

*INVENTOR.*
LAMAR G. WARREN, JR.
BY *Ernest Carl Edge*

United States Patent Office 3,379,192
Patented Apr. 23, 1968

3,379,192
DENTAL TREATMENT DEVICE
Lamar G. Warren, Jr., 2181 NE. 27th Drive, Wilton
Manor, Fort Lauderdale, Fla. 33305
Filed May 10, 1965, Ser. No. 454,348
5 Claims. (Cl. 128—66)

ABSTRACT OF THE DISCLOSURE

A dental treatment device, shaped to conform to the contours of the dentition, which applies fluids to the surfaces of the teeth and gums and removes the fluid, once it has served its usefulness, from the mouth of the user.

---

This invention relates in general to the dental hygiene art and in more particularity to a dental treatment device.

It is the primary object of my invention to provide an effective dental treatment device which applies fluids under high frequency pulsations to the surfaces of the teeth and gums and removes the fluid, once it has served its usefulness, from the mouth of the user.

It is a further object of the invention to provide a master dental treatment unit which may be used by a plurality of users with each one having his own personal mouthpieces therefor. It is contemplated that only one pump and supply mechanism be provided for any particular family or group with the individuals each quickly attaching and detaching his customized mouthpieces.

It is a further object of the invention to provide a dental treatment device which incorporates a completely closed system so as to prevent any spilling of water, etc., over the person and surrounding areas during treatment.

It is a still further object of the invention to provide a dental treatment device in which the pulsating liquid used is applied directly to the teeth and gums at extremely close range so as to make the treatment more effective and more efficient.

It is a further object of the invention to provide a treatment device which is equally effective when used with either natural dentition or artificial dentures.

In its preferred embodiment and in its most desirable use, for cleaning the teeth, water is pumped under high frequency pulsations to a chamber in the inside of the mouthpiece, a series of outlets placed so as to cover all areas of the teeth permits the water to strike the surfaces of the teeth with considerable strength, the unwanted material such as food particles is removed by the force of the water, and the water, including the removed foreign matter, is evacuated through a second series of strategically placed outlets to a second chamber within the mouthpiece. The water is then removed from this chamber by the pump and carried off to a suitable disposal location.

Other objects, advantages, and capabilities of my invention will be more apparent from the following description, taken in conjunction with the accompanying drawing, wherein.

Figure 1:
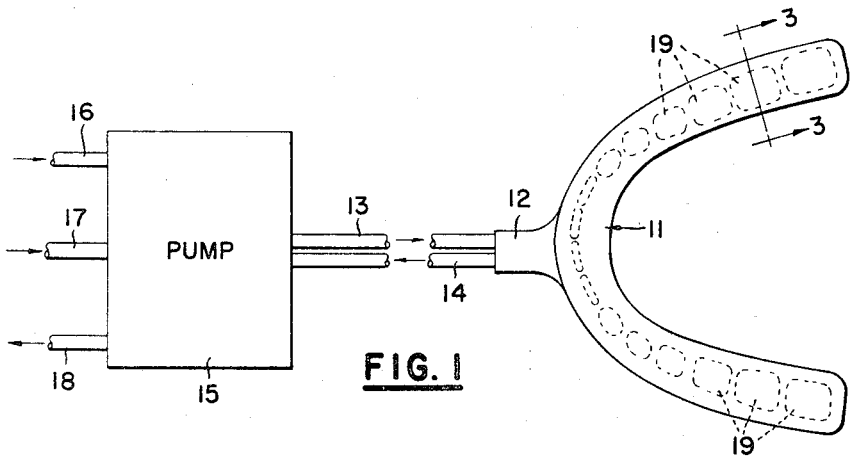
FIGURE 1 is a top plan view of my device applied to the lower dental arches.

Referring now to FIGURE 1 of the drawing, the mouthpiece 11 is shown connected to inlet tube 13 and outlet tube 14 by means of neck member 12. Tubes 13 and 14 are connected to pump 15. It is contemplated that pump 15 be multi-purpose in that it pumps the material to the mouthpiece 11 through inlet tube 13 under high frequency pulsations and also pumps the material back from mouthpiece 11 through outlet tube 14. The pump 15 may be provided with any number of inlets desired for different materials to be used but is illustrated here as having a liquid inlet 16 and an air inlet 17. Pump 15 is also shown as having an exhaust 18 but could be provided with a plurality of exhausts if desired.

The neck 12 is easily attached to an detached from tubes 13 and 14 by any suitable connection.

As can be seen in this FIGURE 1, the mouthpiece 11 fits over and completely covers the teeth 19. The mouthpiece is made of a relatively soft, resilient, easily molded material in order that it may be molded to fit the dentition of the individual.

Figure 2:
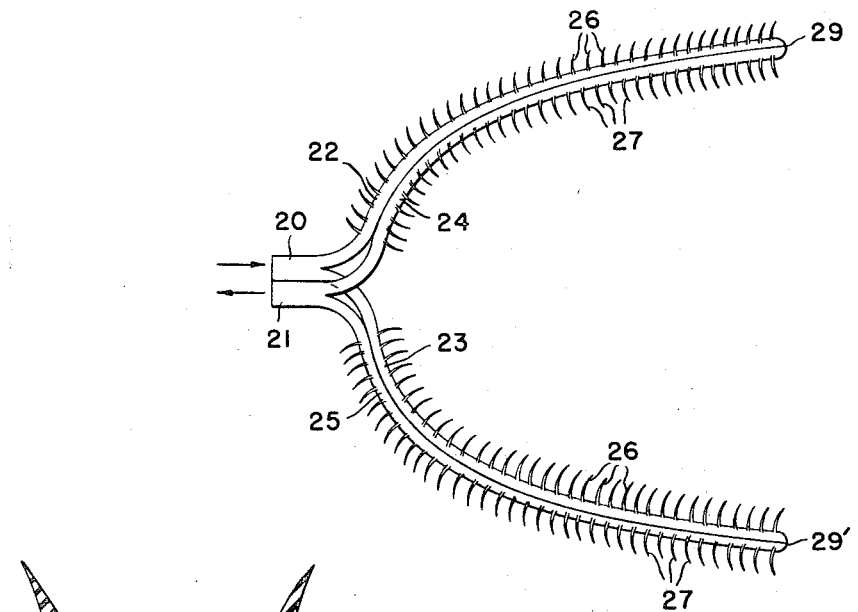
FIGURE 2 is a plan view of the network of inlets and outlets imbedded within the individual mouthpiece.

FIGURE 2 shows the network of inlets and outlets which are molded within the resilient material of mouthpiece 11. Within the neck member 12 are inlet 20 and outlet 21 for connection, respectively, with inlet tube 13 and outlet tube 14. Inlet 20 leads to chamber 22 along one side of the mouthpiece and also to chamber 23 along the opposite side of the mouthpiece. Outlet 21 is connected to chamber 24, substantially parallel to chamber 22, and to chamber 25, substantially parallel to chamber 23.

Further, the tubes 20 and 21 in neck 12 are of the same size so as to permit easy reversal of the connection and make 21 the inlet and 20 the outlet, if so desired. This will permit easy cleaning of the device and the removal of any food particles which may become lodged therein.

Each of chambers 22 and 23 have a plurality of fingers 26 extending therefrom and each of chambers 24 and 25 have a plurality of fingers 27 extending therefrom. Each finger 26 and 27 is open at its outermost end.

Chambers 22 and 24 are closed at their outermost end 29 while chambers 23 and 25 are closed at 29'.

Figure 3:
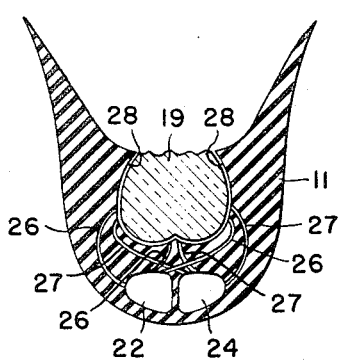
FIGURE 3 is a cross-sectional view taken substantially on the lines 3—3 of FIGURE 1.

FIGURE 3 illustrates how the network of tubes and fingers is molded into and fits within mouthpiece 11. Fingers 26 leading off from chamber 22 are directed toward different areas of the tooth 19 fitting within the hollow portion 28 of member 11. Fingers 27 leading from various areas of the hollow portion 28 are directed into chamber 24.

Operation of this modification for cleaning the teeth is as follows: a liquid is pumped by pulse pump 15 through tube 13 into chambers 22 and 23 of mouthpiece 11. A suggested pulsation velocity is 60 vibrations per second although pump 15 should be adjustable to provide a wide variation of pulse velocities. The water strikes all surfaces of the teeth 19 by means of the outlets at the ends of fingers 26 and as soon as the water has struck the tooth surface it is evacuated through the suction provided in fingers 27 and chambers 24 and 25 by pump 15. There is a continual pulsation of water against the tooth surfaces and between the teeth and a continual evacuation of the expended liquid.

Figure 4:
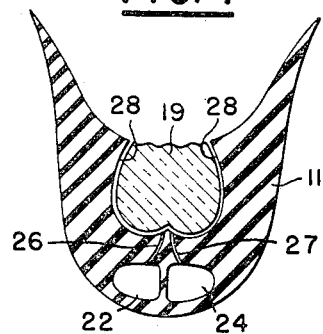
FIGURE 4 is a cross-sectional view of a modification of the mouthpiece wherein the inlets and outlets are placed adjacent to the occlusal and incisal surfaces of the teeth only.

FIGURE 4 illustrates an arrangement of the same components as the modification of FIGURES 1 through 3 except that the contact with the hollow portion 28 is limited to the area adjacent the occlusal and incisal surfaces of the teeth. All of the fingers 26 and 27 end in alignment with the occlusal and incisal surfaces.

Operation of this modification is substantially the same as the previously described embodiment of the invention.

Figure 5:
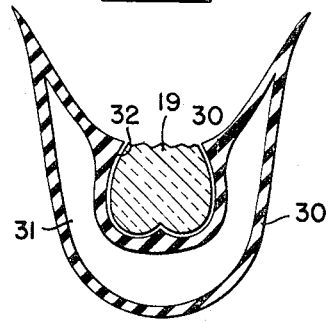
FIGURE 5 is a further modification used primarily for massaging of the teeth and gums.

In FIGURE 5 there is illustrated a modification of the basic invention which is used primarily for massaging the teeth and gums. Mouthpiece 30 has the usual cavity 32 for reception of the teeth 19 and a single chamber 31 within the body of the mouthpiece.

Liquid is pumped in under pulsation through an inlet similar to inlet 20 of FIGURE 2. The pulsations of the liquid causes the relatively thin walls surrounding the chamber 31 to move in response to the pulsations. In so moving, the teeth 19 and gums are massaged vigorously. An outlet similar to outlet 21 is used to remove the liquid from chamber 31.

As the cleaning action is secondary in this embodiment, pulsating air could be used as a substitute for the usual liquid.

Figure 6:
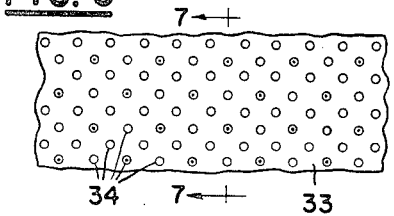
FIGURE 6 illustrates a modified inside surface in which a plurality of closely spaced papillae are used.
Figure 7:
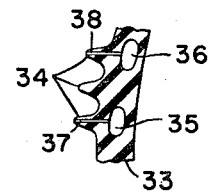
FIGURE 7 is a cross-sectional view taken substantially on the lines 7—7 of FIGURE 6.

FIGURES 6 and 7 illustrate a type of liner for the mouthpiece which may be used in any of the modifications disclosed in this specification if desired.

Mouthpiece 33 is shown as having a plurality of small projections 34 which are to be placed in the area which contacts the teeth and the gums. Inlet chamber 36 has a plurality of small tubes 38 extending therefrom with the outlet of each tube 38 located in the tip of a projection 34.

Outlet chamber 35 has a plurality of small tubes 37 extending therefrom with the end of each tube 37 in the tip of a projection 34.

As the projections or papillae 34 are rather small they are easily vibrated by the pulsating action of the liquid being pumped in and evacuated and provide a stimulating massage for the teeth and the gums.

It is obvious that if this type of surface were used in the modification shown and described in FIGURE 5 the inlets 38 and outlets 37 would be eliminated and the movement of the papillae 34 would be relied upon for the treatment.

Figure 8:
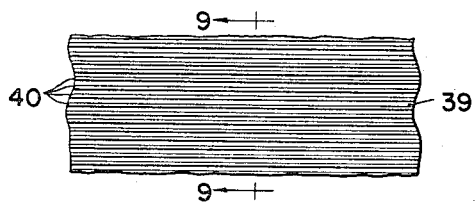
FIGURE 8 is a further modification of the inside surface of the mouthpiece.
Figure 9:
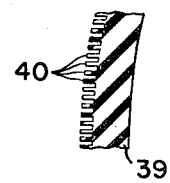
FIGURE 9 is a cross-sectional view taken substantially on the lines 9—9 of FIGURE 8.

FIGURES 8 and 9 illustrate a still further modification of the material which may be used for the inside contact surfaces of any of the several embodiments. In these FIGURES 8 and 9 the wall 39 of the mouthpiece is shown as containing a plurality of longitudinally extending ribs 40. These ribs 40 provide the same type of action as the projections 34 of FIGURES 6 and 7.

If desired, this type of wall could be used with the modifications shown in which fluid outlets and inlets are provided as well as the modification of FIGURE 5 where no outlets are provided.

Figure 10:
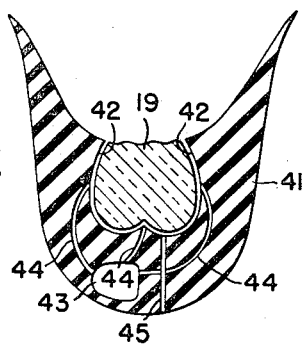
FIGURE 10 is a modification of the mouthpiece in which there is no pumping out of the used fluid but instead, outlets are provided to permit it to run down into the mouth of the user.

FIGURE 10 illustrates a variation of my invention in which the evacuating system is eliminated and the liquid is permitted to drain into the mouth of the user.

Mouthpiece 41 has a hollow portion 42 for receiving teeth 19. Inlet chamber 43 has a plurality of tubes 44 extending therefrom and ending at different locations within the cavity 42.

A plurality of drains 45 are provided in the lowermost regions of cavity 42 with the drains opening into the outer surface of mouthpiece 41. The drains may take the form of tubes as shown here or the form of elongated slots, either lateral or longitudinal, to provide more drainage per opening. Further, the rearwardmost ends of the mouthpieces may also be eliminated to permit drainage into the back portions of the mouth.

In making the mouthpieces for the user, a reproduction of the upper and lower dental arches would be made by well known molding processes, and the mouthpieces formed around the reproduction. As the inlet tubes and fingers are relatively flexible they may be easily placed and molded into the resilient material of which the mouthpiece is formed.

If desired, relatively stiff reinforcement members made of plastic or such can be molded into the mouthpiece. However, under ordinary circumstances the inlet and outlet tubes would provide sufficient rigidity for the device.

Although several embodiments of my invention have been shown and described, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best suited to the conditions of a particular use, and still be within the scope of my invention.

What is claimed is:

1. A dental treatment device comprising
   (a) a mouthpiece molded to conform to the configuration of the dentition,
   (b) a plurality of hollowed out portions within the body of said mouthpiece,
   (c) a tube connected to each of said hollow portions,
   (d) each of said tubes adapted to be connected to a source of fluid supply, and
   (e) a plurality of outlets extending from each of said hollow portions to the teeth-receiving portion of the mouthpiece.

2. A dental treatment device according to claim 1 with
   (f) a plurality of papillae on the inside teeth-receiving portion of the mouthpiece.

3. A dental treatment device according to claim 1 with
   (f) a plurality of longitudinal ridges extending along the inside teeth-receiving portion of the mouthpiece.

4. A dental treatment device comprising
   (a) a mouthpiece molded to conform to the configuration of the dentition,
   (b) a plurality of hollowed out portions within the body of said mouthpiece,
   (c) a tube connected to each of said hollow portions,
   (d) each of said tubes adapted to be connected to a source of fluid supply,
   (e) a plurality of outlets extending from each of said hollow portions to the teeth-receiving portion of the mouthpiece,
   (f) a plurality of papillae on the inside teeth-receiving portion of the mouthpiece, and
   (g) each of the outlets extending from each of said hollow portions to the teeth-receiving portion of the mouthpiece opening at the tip of a papilla.

5. A dental treatment device comprising
   (a) a mouthpiece molded to conform to the configuration of the dentition,
   (b) a single hollowed out portion within the body of said mouthpiece,
   (c) an inlet tube conected to said hollow portion and adapted to be connected to a pump device,
   (d) an outlet tube connected to said hollow portion and adapted to be connected to a pump device, and
   (e) a plurality of drains extending from the teeth-receiving portion to the outside surface of said mouthpiece.

References Cited
UNITED STATES PATENTS

| 803,474 | 10/1905 | Dennis. |
| 1,500,107 | 7/1924 | Chandler. |
| 3,211,149 | 10/1965 | Fono. |

FOREIGN PATENTS

| 1,126,012 | 7/1956 | France. |
| 601,921 | 2/1960 | Italy. |

L. W. TRAPP, *Primary Examiner.*